(12) United States Patent
Nielsen et al.

(10) Patent No.: US 6,585,384 B2
(45) Date of Patent: Jul. 1, 2003

(54) WIRELESS REMOTE CONTROLLED MIRROR

(75) Inventors: Erik R. Nielsen, Issaquah, WA (US); Paul R. Illian, Sr., Seattle, WA (US); John H. Moselage, Carnation, WA (US); Adam L. Smith, Monroe, WA (US); Gordon Keller, Yakima, WA (US)

(73) Assignee: N-K Enterprises LLC, Issaquah, WA (US)

( * ) Notice: Subject to any disclaimer, the term of this patent is extended or adjusted under 35 U.S.C. 154(b) by 0 days.

(21) Appl. No.: 09/895,148

(22) Filed: Jun. 29, 2001

(65) Prior Publication Data

US 2003/0002180 A1 Jan. 2, 2003

(51) Int. Cl.⁷ ............................................... G02B 7/182
(52) U.S. Cl. ........................................ 359/877; 359/838
(58) Field of Search ................................. 359/838, 843, 359/844, 872, 877

(56) References Cited

U.S. PATENT DOCUMENTS

| | | | |
|---|---|---|---|
| 4,702,572 A | 10/1987 | Cossey | |
| 5,056,905 A | 10/1991 | Jensen | 359/843 |
| 5,576,898 A | 11/1996 | Rubin | 359/841 |
| 5,619,254 A | * 4/1997 | McNelley | 348/14.08 |
| 5,886,738 A | * 3/1999 | Hollenbeck et al. | 340/936 |
| 5,971,549 A | 10/1999 | Cruickshank | 359/843 |
| 6,039,455 A | 3/2000 | Sorenson | 362/142 |
| 6,120,155 A | 9/2000 | Brennan et al. | 359/857 |
| 6,270,227 B1 | 8/2001 | Tsuyama | 359/871 |

* cited by examiner

Primary Examiner—Mark A. Robinson
(74) Attorney, Agent, or Firm—Ronald M. Anderson

(57) ABSTRACT

A wireless remote controlled mirror enabling a user to selectively adjust a view from a remote location. A preferred embodiment enables a driver to remotely control a mirror attached to a rear seat of a vehicle to remotely adjust the view of a child in a rear-facing safety seat. A preferred embodiment includes a base that mounts to an object (such as the safety seat or the rear seat), a reflective lens that moves relative to the base, one or more electric motors to drive the reflective lens, and a receiver that detects a command signal from a wireless remote controller and energizes the one or more motors to reorient the reflective lens to view the child. The mirror can alternatively be mounted on other portions of a vehicle, e.g., as a remote controlled side mirror.

28 Claims, 13 Drawing Sheets

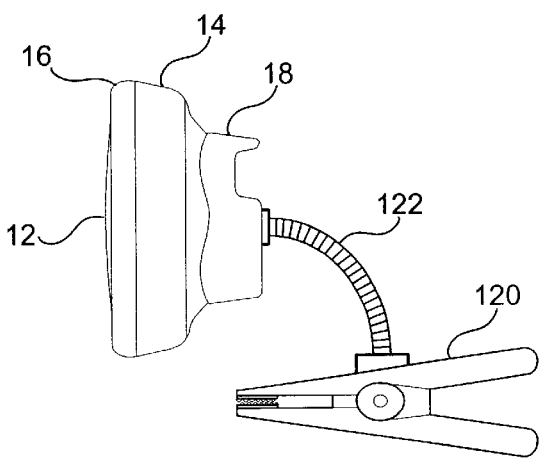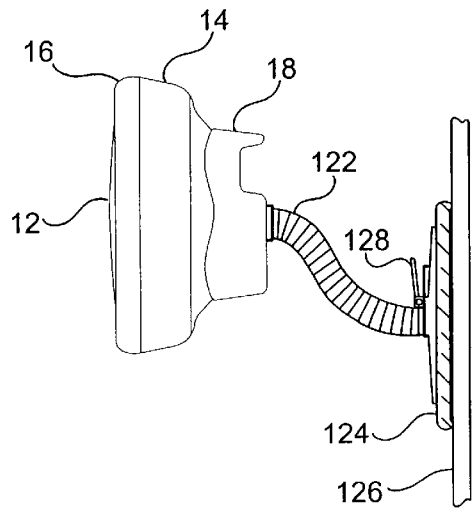
*FIG. 11*  *FIG. 12*
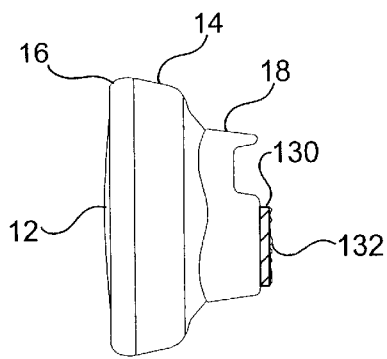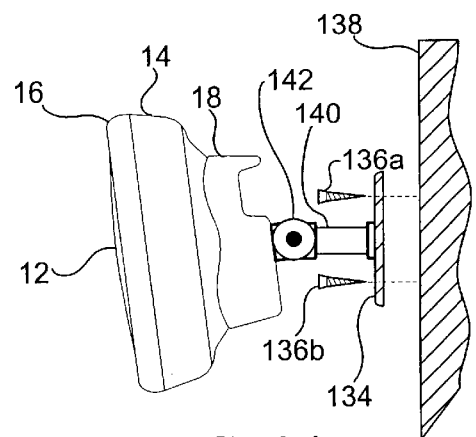
*FIG. 13*  *FIG. 14*
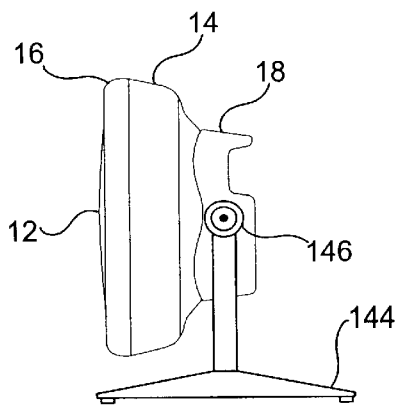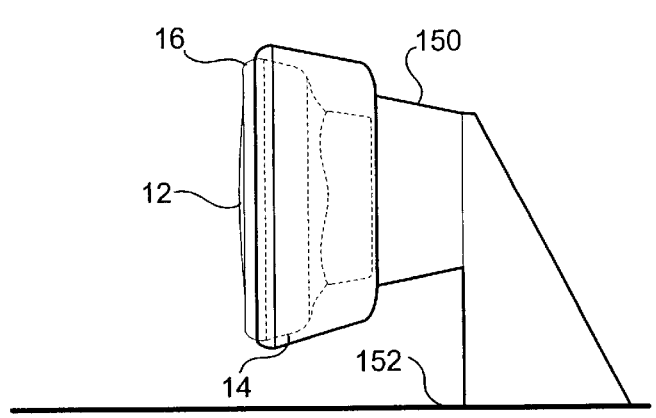
*FIG. 15*  *FIG. 16*

WIRELESS REMOTE CONTROLLED MIRROR

FIELD OF THE INVENTION

The present invention generally relates to apparatus and a method for selectively changing the orientation of a mirror, and more specifically, to mirror mounted in or on a vehicle and employing a wireless remote control for changing the field of view of the mirror.

BACKGROUND OF THE INVENTION

A variety of manually controlled mirrors are typically provided on vehicles, including an interior overhead rear-view mirror, one or more side-view mirrors, and visor mounted vanity mirrors. Another mirror now sold for use in a vehicle is intended for monitoring a child strapped into a rear-facing child car seat. This mirror is mounted and manually positioned so as to enable a driver (or other person) seated in the front seat to view the reflection of a child seated in the rear-facing child car seat by looking at the reflection of that mirror in the conventional overhead rear view mirror.

Several patents have been issued that are directed to mirrors for viewing an infant sitting in a car seat facing toward the rear. For example, U.S. Pat. No. 6,120,155 (Brennan et al.) discloses a clamping arrangement for attaching a child monitoring mirror to the back cushion of the rear seat in a vehicle. Similarly, U.S. Pat. No. 6,039,455 (Sorenson) discloses an infant observation mirror that is attached to an infant car seat to enable a driver to view the infant in the conventional interior rear-view mirror. A roof-mounted mirror that is intended for use in conjunction with the conventional interior rear-view mirror for viewing an infant is disclosed in U.S. Pat. No. 5,576,898 (Rubin). The roof-mounted mirror is hinged so that it can be folded up into the head liner and can also be used by a passenger sitting in the rear seat as a conventional vanity mirror. Finally, U.S. Pat. No. 4,702,572 (Cossey) discloses a mirror that is mounted to the back cushion of a rear seat for viewing an infant and which has an adjustable post secured by a pin for controlling the height of the mirror. The mirror is mounted using a spring-loaded bracket that extends over the top back portion of the rear seat cushion in a vehicle.

It would be desirable to enable a user to remotely control the orientation or field of view of a mirror used for viewing an infant. Although the prior art references noted above enable a driver to manually adjust the orientation of a mirror to enable a rear-facing child to be viewed, such manually adjusted mirrors can readily move out of position due to vibration of the automobile or motion of the supporting seat. The child can also change position sufficiently in a car safety seat so as to be outside the field of view of the driver. To correct the mirror position, a driver should stop the vehicle, and enter the back seat of the vehicle to make an adjustment, return to the driver's seat in order to check the view, and repeat these steps, if necessary, until the proper mirror orientation is achieved, and then continue driving. Within a short time, the mirror may again need to be readjusted due to automobile vibration, supporting seat movement, a child or toy hitting the mirror, or other disturbances to the mirror or child's position. It would be unsafe for the driver to adjust such mirrors while driving, and leaning over the front seat to reach the mirror is often not possible, particularly for a short driver. Thus, it would be very desirable to enable a user to remotely readjust the orientation of a mirror with a wireless controller, without leaving the front seat. The adjustment of a remote controlled mirror could safely be accomplished while stopped at a stop sign or stop light.

If a remotely controlled mirror is provided for viewing a child or for other purposes on a vehicle, it would be desirable to provide a user full control over the angular position of the mirror about one or both of the X and Y axes. Such a mirror could be used in many other applications besides viewing an infant. For example, an exterior wireless remote controlled mirror could be mounted on one or both sides of the vehicle that was purchased without exterior side mirrors, or to replace manually adjusted side mirrors. Use of such a wireless remote controlled mirror would eliminate the expense and difficulties of routing direct wire connections between a position controller and the mirror(s), and would enable greater flexibility in relocating and readjusting the mirror for various purposes.

Motorized side-view mirrors are often provided as factory installed options on vehicles. However, these motorized mirrors are controlled by a factory installed four-position switch that is hardwired to the mirror by a factory installed wiring harness. The four-position switch is typically located near the driver and if two side mirrors are provided, typically includes a selector switch so that the driver can determine whether the left or right side mirror is controlled by the four-position switch. These switches are connected to the vehicle's electrical system and hardwired to the side mirrors. If a vehicle was purchased without the motorized adjustable side mirrors, there is typically no easy way to retrofit the vehicle with after market add-on mirrors of that type. Thus, it would be desirable to provide wireless remotely controlled side mirrors that can be retrofitted without the need for installing hardwired switches and complex wiring harness.

One remotely adjusted side mirror is disclosed in U.S. Pat. No. 5,056,905 (Jensen). In this invention, which is intended for use on a truck and trailer, a transmitter is mounted at a rear corner of a trailer and directs a signal at an acute angle outwardly from the side of the trailer toward the front of the vehicle. When the truck turns relative to the trailer, the signal from the transmitter is received by a receiver in the outwardly extending rear-view mirror, causing the mirror to change angular position horizontally so that more of the area to the side of the trailer is visible to the driver. When the truck and its trailer are again generally aligned, the signal from the transmitter is no longer incident on the receiver, and the mirror then returns to its normal position in which it shows less of the area to the side of the trailer and more of the area to the rear. In a second embodiment, the transmitter is selectively controlled in response to a steering gear position. However, each embodiment disclosed by Jensen automatically adjusts the position of the mirror in response to the orientation of the vehicle, and not under the control of the user.

Accordingly, it will be apparent that there is a definite need for a wireless remote controlled mirror for use in various vehicle applications. Such a mirror could be used for viewing a child, as a new or replacement side mirror, or as an auxiliary mirror for extending the view of different portions of the environment around a vehicle. For example, an auxiliary mirror that is capable of wireless remote control could be very useful in extending the view of the road when towing a trailer or carrying loads that block the normal rear view mirror view. The ability to remotely adjust the orientation and view of such a mirror with a wireless control would enable the mirror to be positioned where optimum benefit can be achieved, without requiring any wiring to be installed (if a battery supply is provided on the mirror), or if it is desirable to supply vehicle power to the mirror, by providing only a single power lead to the mirror.

SUMMARY OF THE INVENTION

In accord with the present invention, a wireless remote controlled mirror includes a base; a prime mover that is attached to the base, a reflective lens movably coupled to the prime mover; and a receiver that controls the prime mover, such that in response to a wireless signal received by the receiver the prime mover reorients the reflective lens. Preferably, the base is attachable to an object such as an automobile seat or other surface using either a strap, a clip, a clamp, a mounting frame, one or more bolts, an adhesive, or other suitable mount. The reflective lens is coupled to the prime mover and pivots with respect to the base when driven by the prime mover. The prime mover, which is preferably an electric motor, rotates a threaded shaft that engages threads coupled to the reflective lens, causing the reflective lens to pivot. The receiver receives an RF signal from a remote controller that causes the prime mover to drive the reflective lens in a desired direction by pivoting it about an axis.

One application of the present invention is directed to a system that enables a front-facing person (e.g., the driver) in a vehicle to remotely control the mirror to view a rear-facing passenger disposed behind the front-facing person, for example, to view a child in a rear-facing child safety seat. Preferably, the wireless remote controlled mirror is mounted either to a rear passenger seat that supports the rear-facing child seat, or directly to the rear-facing child seat. It is also contemplated that the wireless remote controlled mirror might be fabricated as an integral part of a rear-facing child seat. The wireless remote controlled mirror is directed toward a front of the vehicle such that a reflection of the child in the wireless remote controlled mirror may be viewed by the front-facing person, who is looking at the reflection in a conventional rear-view mirror of the vehicle. Preferably, the position of the wireless remote controlled mirror is controlled with a four-way directional switch included on a hand-held remote controller, such as a key fob, in which a transmitter is disposed. The wireless remote controlled mirror can alternatively be mounted on other surfaces of a vehicle and used for other purposes besides viewing a rear-facing passenger.

Another aspect of the present invention is directed to a method for positioning a wireless remote controlled mirror that includes a reflective lens pivotally mounted in a housing.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 11 is a side elevational view of the wireless remote controlled mirror showing a clamp for use in mounting the mirror to an object;

FIG. 12 is a side elevational view of the wireless remote controlled mirror showing a suction cup for use in mounting the mirror to an object;

FIG. 13 is a side elevational view of the wireless remote controlled mirror showing the use of an adhesive layer for mounting the mirror to an object;

FIG. 14 is a side elevational view of the wireless remote controlled mirror showing a mounting plate and fasteners for use in mounting the mirror to an object;

FIG. 15 is a side elevational view of the wireless remote controlled mirror showing a stand for supporting the mirror;

FIG. 16 is a side elevational view of the wireless remote controlled mirror mounted as a side rear-view mirror on a vehicle exterior surface;

DESCRIPTION OF THE PREFERRED EMBODIMENT

Figure 1:
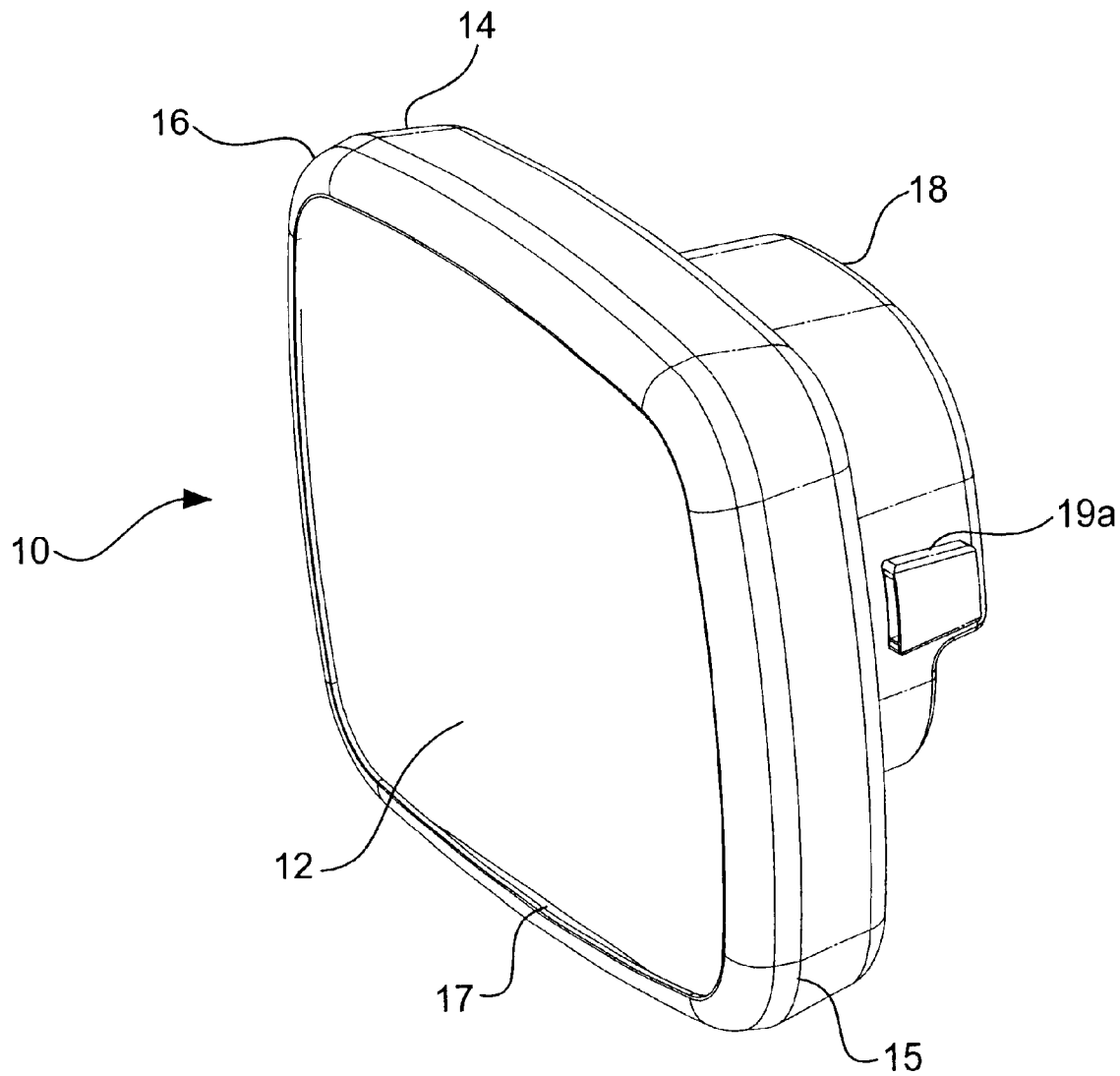
FIG. 1 is an isometric view of a preferred embodiment of the present invention.

FIG. 1 is an isometric view of a preferred embodiment of the present invention. A wireless remote controlled mirror (hereinafter referred to simply as "mirror") 10 includes a reflective lens 12 that is preferably comprised of a glass or plastic with a reflective coating, e.g., a silver coated glass sheet or an aluminum coated MYLAR plastic. Reflective lens 12 is preferably generally quadrilateral in shape and preferably square. However, those skilled in the art will recognize that reflective lens 12 may be formed in numerous other generally planer geometric shapes, such as circular, rectangular, oval, triangular, or other polygon, as a further alternative, can be a curved shape (i.e., not necessarily having a specific geometrical shape). Similarly, those skilled in the art will recognize that the surface of reflective lens 12 may be concave or convex. Further, reflective lens 12 may enable wide angle views, close-up views, or distorted views.

Mirror 10 also includes a housing 14, preferably made of a plastic material, having a geometric shape substantially similar to the shape of reflective lens 12. A front outer edge 15 of housing 14 extends around the perimeter of reflective lens 12. Holding reflective lens 12 within housing 14 is a bezel 16. Bezel 16 includes a bezel opening 17 through which reflective lens 12 is visible. Bezel 16 is attached to front outer edge 15 of housing 14, thereby retaining reflective lens 12 within housing 14. Bezel 16 may be attached to front outer edge 15 with an adhesive, fastener, or other conventional attachment means (not shown).

Mirror 10 also includes a base 18 to which housing 14 that is movably coupled. Base 18 is also preferably fabricated of a plastic material that is injection molded into the general shape of a flat-bottomed cup. Preferably, base 18 has a depth sufficient to contain one or more prime movers and associated circuitry used for receiving a wireless signal to control the orientation of the reflective lens relative to the base. Attached to base 18 is a mounting clip 19a, used to secure mirror 10 to an object. Alternatives for mounting the base to an object are discussed in detail below.

Figure 2:
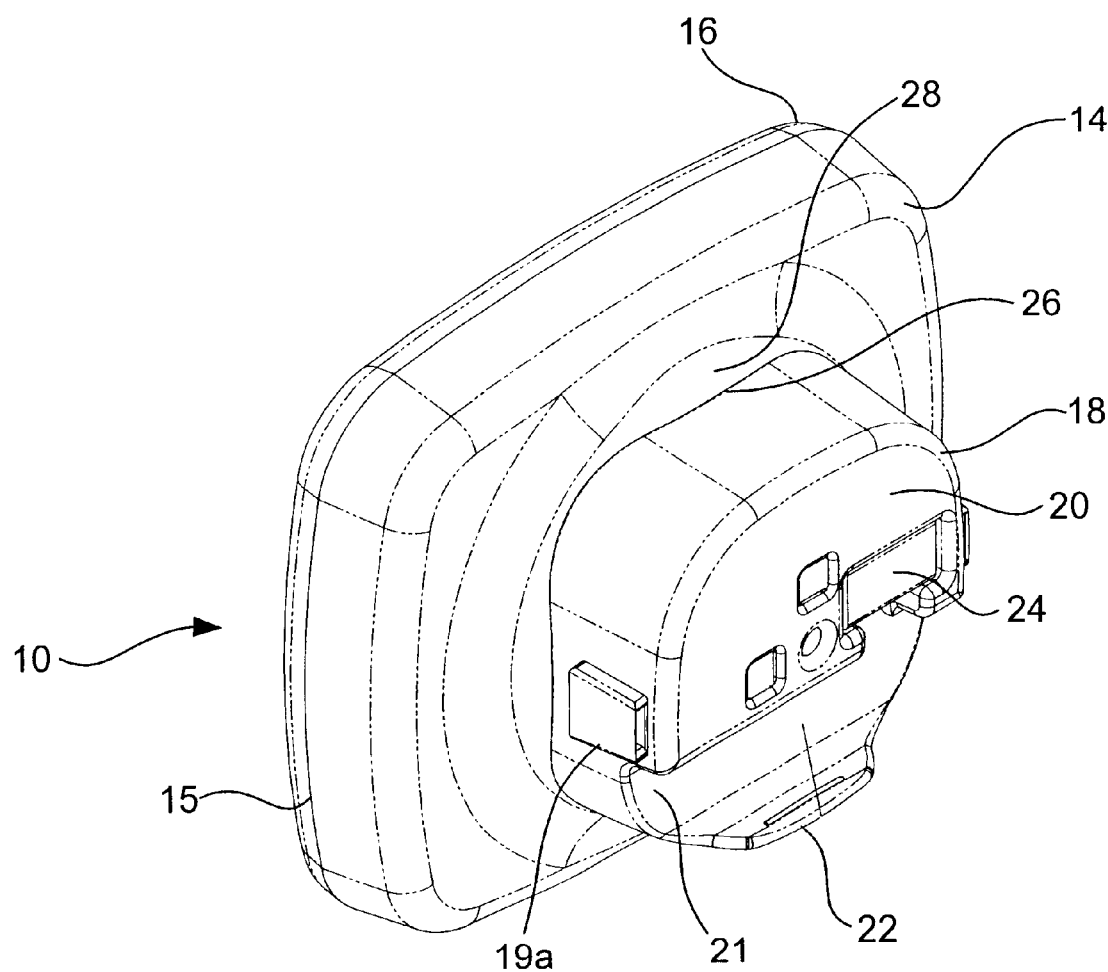
FIG. 2 is an isometric view of a rear portion of the embodiment shown in FIG. 1.

FIG. 2 is an isometric view of a rear portion of a preferred embodiment of the invention. FIG. 2 illustrates that base 18 includes a bottom surface 20 that is formed with a channel 21 and a flange 22 defining one edge of channel 21. Channel 21 is provided to store a remote controller (not shown), for example, when the mirror is removed from a vehicle. Similarly, bottom surface 20 is also formed to include a battery compartment 24 within which a battery (not shown) is installed to provide electrical power to energize the mirror.

Base 18 also includes a contoured edge 26 disposed opposite bottom surface 20. The contoured edges defines an open end of the base within which the housing is movably pivoted, since the shape of contoured edge 26 is designed to accommodate motion of a positioning surface 28 on the rear of the housing 14, opposite front outer edge 15. Contoured edge 26 allows positioning surface 28 to pivot relative to the base, while also minimizing a gap between contoured edge 26 and positioning surface 28. A seal may optionally be incorporated along contoured edge 26 to prevent contaminants from entering the interior of base 18.

Figure 3A:
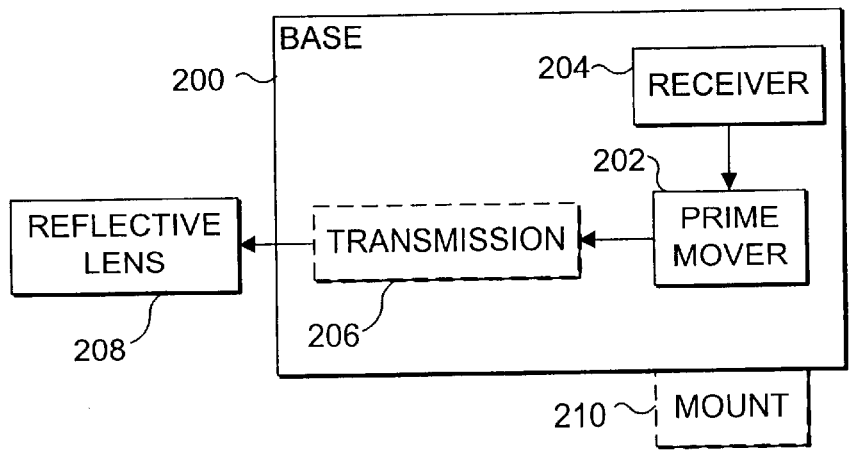
FIG. 3A is a block diagram of one preferred embodiment of the present invention.

FIG. 3A is an overview block diagram of a mirror in accord with the present invention. In this Figure, a base 200 includes at least one prime mover 202, a receiver 204 and an optional transmission 206. Prime mover 202 is attached to base 200 and is drivingly coupled to reorient a reflective lens 208. Optional transmission 206 may be coupled between prime mover 202 and reflective lens 208 to transfer a rotational motion of the prime mover into an angular orientation of the reflective lens about at least one axis in a desired direction. Optionally attached to base 200 is a mount 210 for mounting the wireless remote controlled mirror to an object or surface on or about a vehicle.

Figure 3B:
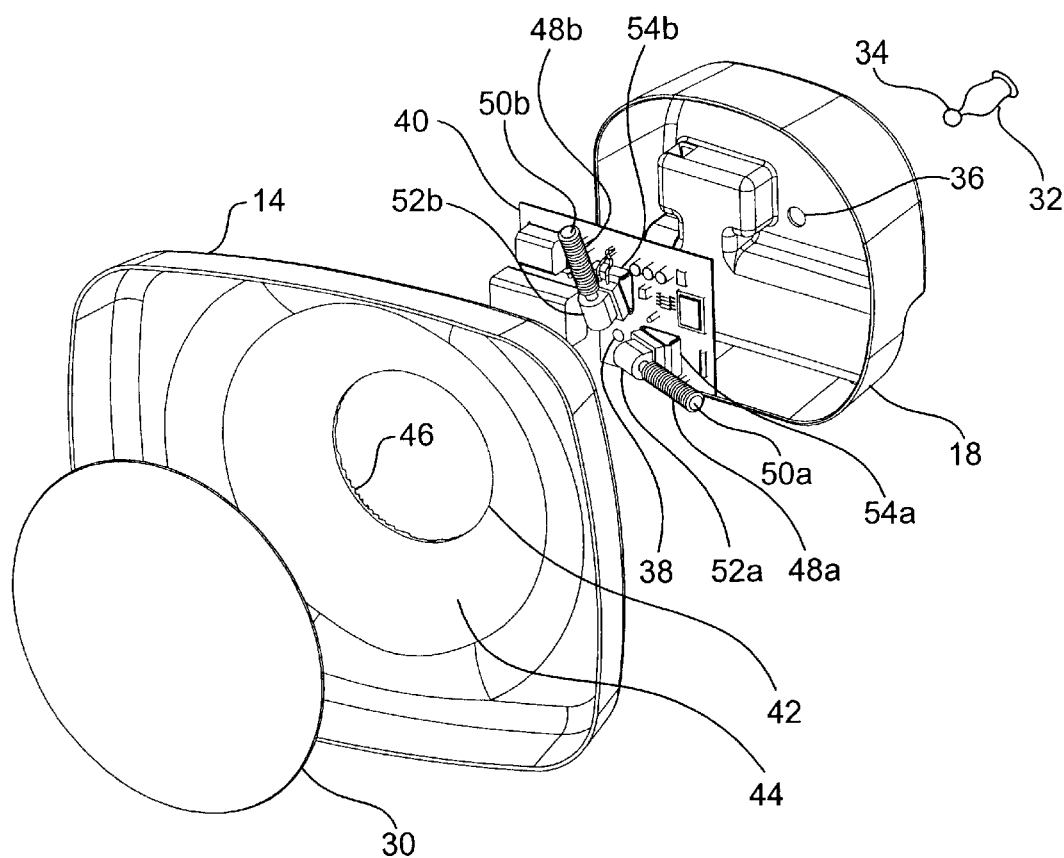
FIG. 3B is an exploded view of the embodiment of the invention shown in FIGS. 1 and 2.
Figure 4:
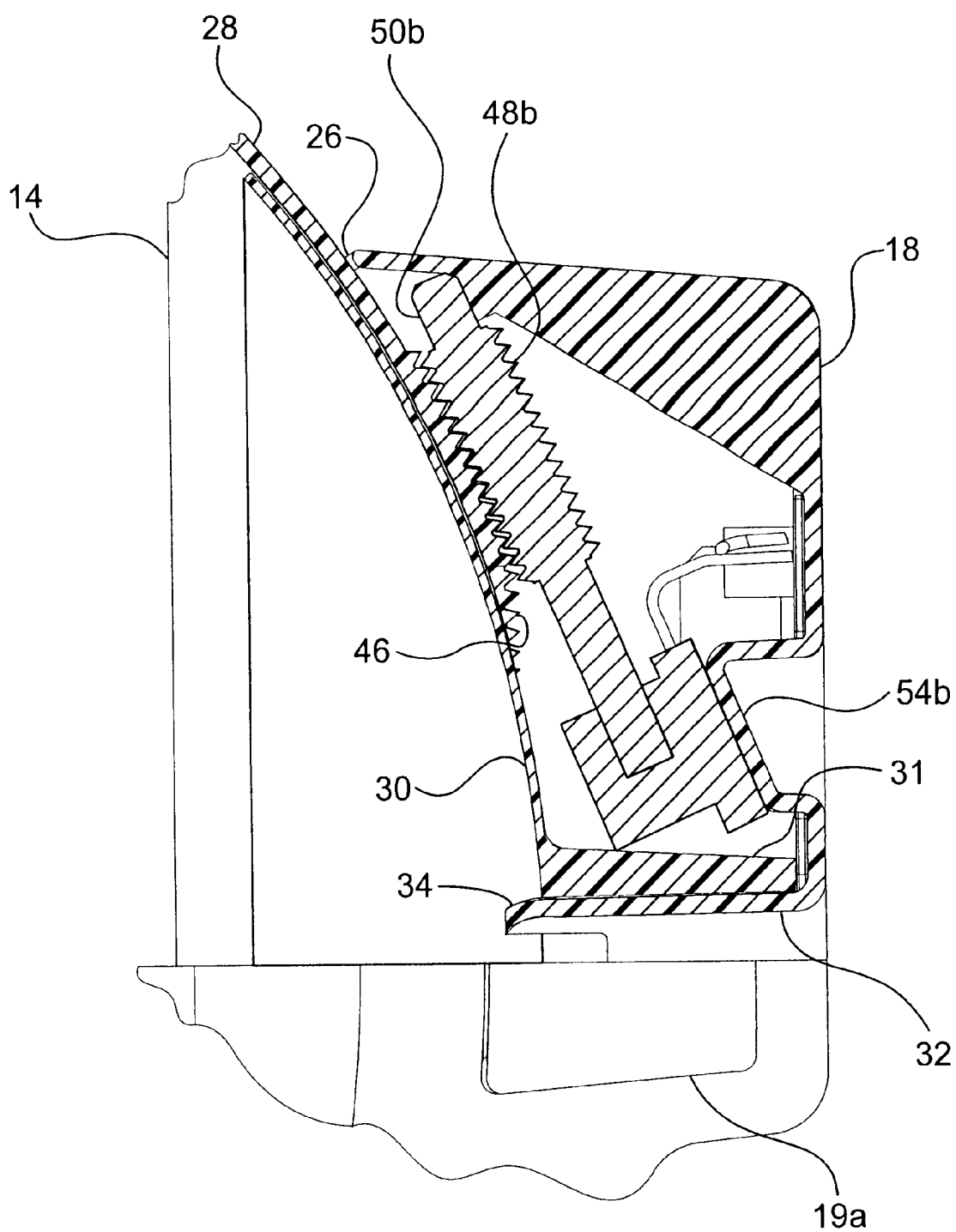
FIG. 4 is a detailed sectional view of a drive mechanism used to pivot the mirror assembly.

In FIGS. 3B and 4 illustrate details of the mechanism used to mount and pivot the reflective lens relative to the base. In FIG. 3B, for the sake of clarity, reflective lens 12 is not shown. Within housing 14 is disposed a dome 30 having a convex rear surface and including a socket 31 (shown in FIG. 4). Socket 31 extends from the center of the convex rear surface of dome 30 through an orifice 42 of positioning surface 28. Socket 31 provides an interference snap fit over a pin 32. Pin 32 has a ball 34 that is inserted through a hole 36 of base 18, and through a hole 38 formed in a circuit board 40. Alternatively, pin 32 may be formed as part of base 18 and extend from the center of the interior portion of base 18. Socket 31 holds the convex rear surface of dome 30 in sliding contact with an inner or front surface 44 of housing 14, which, in turn, maintains positioning surface 28 of housing 14 in sliding contact with contoured edge 26 of base 18. This arrangement of sliding surfaces enables housing 14 to pivot relative to dome 30 and base 18, both of which are stationary as the housing and reflective lens are moved.

Attached to positioning surface 28 of housing 14 are driven threads 46, formed as tracks with the teeth of the threads extending transversely across the width of the tracks. Driven threads 46 engage helical driving threads 48a and 48b of threaded shafts 50a and 50b, respectively.

Motors 52a and 52b drivingly rotate threaded shafts 50a and 50b, respectively. Preferably, the two motors and threaded shafts are oriented to drive housing 14 about orthogonal axes. Motors 52a and 52b are mounted on brackets 54a and 54b, respectively, which are formed as a part of base 18. Alternatively, brackets 54a and 54b are secured to circuit board 40, which is secured to base 18. Motor 52b drivingly rotates threaded shaft 50b so that engagement of helical driving threads 48b with driven threads 46 moves positioning surface 28 of housing 14. Threaded shaft 50b is thus a worm gear that acts on driven threads 46, causing positioning surface 28 of housing 14 to pivotally slide between contoured edge 26 of base 18 and the convex surface of dome 30. Those skilled in the art will recognize that a variety of other driving means may be employed to pivot housing 14, or reflective lens 12. Other means contemplated for coupling one or more prime movers to housing 14 include a ball joint, a universal joint, a linkage bar, a spring, or a cable, but it is clear that still other conventional techniques can be employed in some form of transmission that is used to direct a force applied by a prime mover to moving the housing and the reflective lens about one or two axes.

Figure 5:
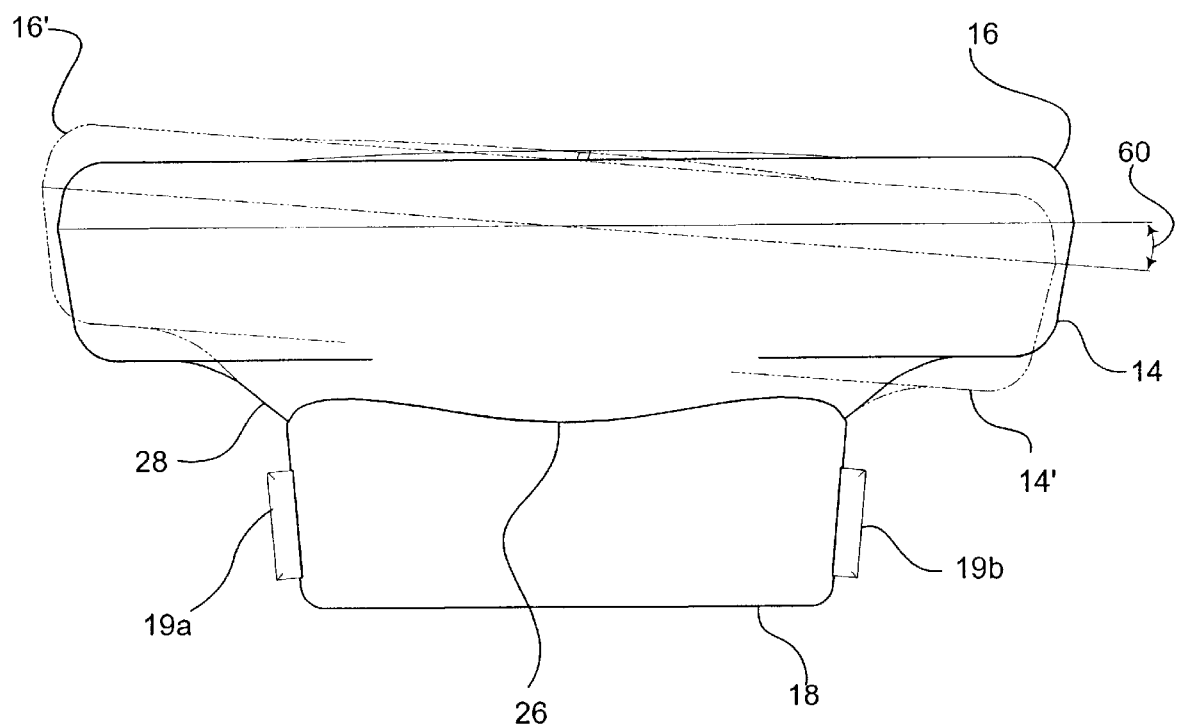
FIG. 5 illustrates the pivoting motion of the mirror assembly relative to the base.

FIG. 5 the pivoting motion of housing 14 about one axis. When one of the motors is activated by a drive signal (discussed below), the threaded shaft by that motor causes housing 14 to pivot through an angle of up to about 60, so that the reflective lens is reoriented to a new position, for example, as illustrated by broken lines delineating housing 14' and bezel 16'. While movement about only one axis is illustrated, it will be apparent that a similar movement about an orthogonal axis (extending from left to right through base 18, as shown in the example of FIG. 5) can also be carried out by energizing the other motor. Both motors can be energized simultaneously to cause movement about both orthogonal axes at the same time, if desired.

Figure 6:
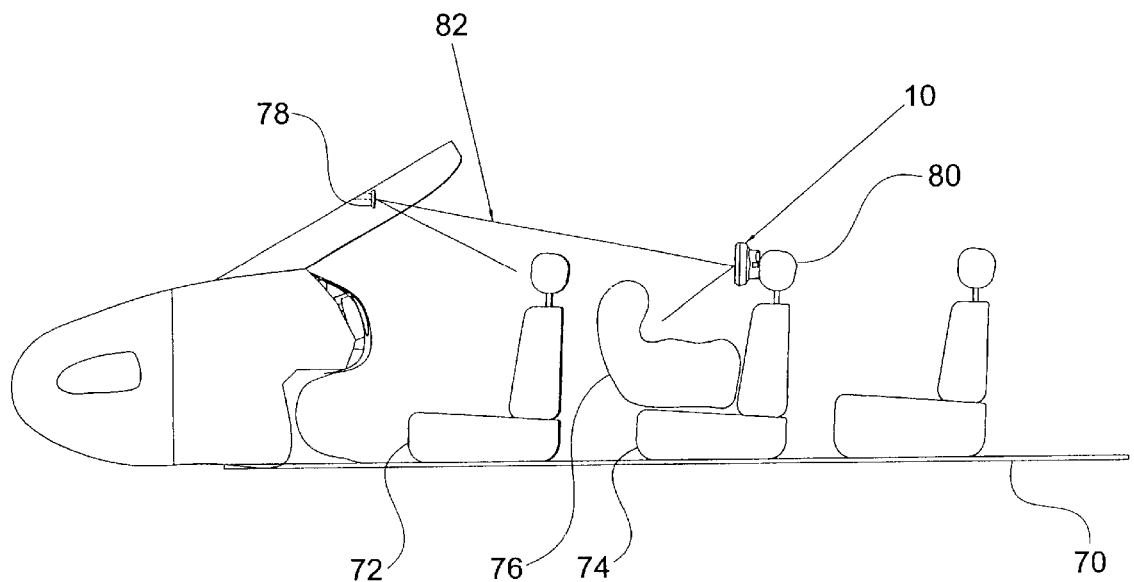
FIG. 6 is a cut-away schematic view of a vehicle illustrating an application of the wireless remote controlled mirror for viewing a child in a rear-facing child safety seat.

FIG. 6 illustrates preferred application of the present invention in which the mirror is employed in a vehicle for viewing a child. An automobile 70 includes a front seat 72 and a passenger seat 74 that is disposed behind front seat 72. Strapped onto passenger seat 74 is a rear-facing child safety seat 76, which designed to support a child facing toward a rear of automobile 70. A driver or other person (not shown) in automobile 70 may use a conventional overhead rear-view mirror 78 to view an area behind front seat 72, but the child is not normally visible in the conventional overhead rear-view mirror, since the child is hidden by the rear-facing child safety seat. Even when turning around, the child will not normally be visible. To solve this problem, mirror 10 is mounted to a headrest 80 that is attached to passenger seat 74. The driver can then view the child inside rear-facing baby seat 76 via a line of sight 82—but only if the orientation of mirror 10 is set so that the reflection of the child in the reflective lens of mirror 10 is visible in the conventional overhead rear-view mirror. As described below, the driver or another person in the front seat may wirelessly, remotely adjust the view or orientation of the reflective lens in mirror 10 while remaining seated and without reaching back to the mirror from front seat 72.

Figure 7A:
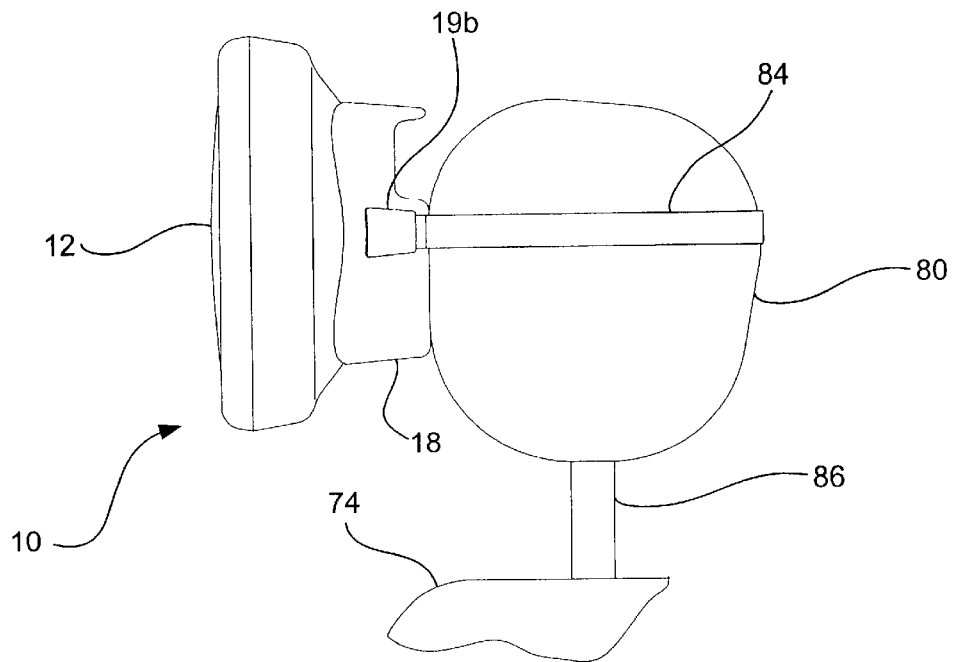
FIG. 7A is a side elevation view illustrating attachment the of the remote controlled mirror to a vehicle seat headrest with a strap.
Figure 7B:
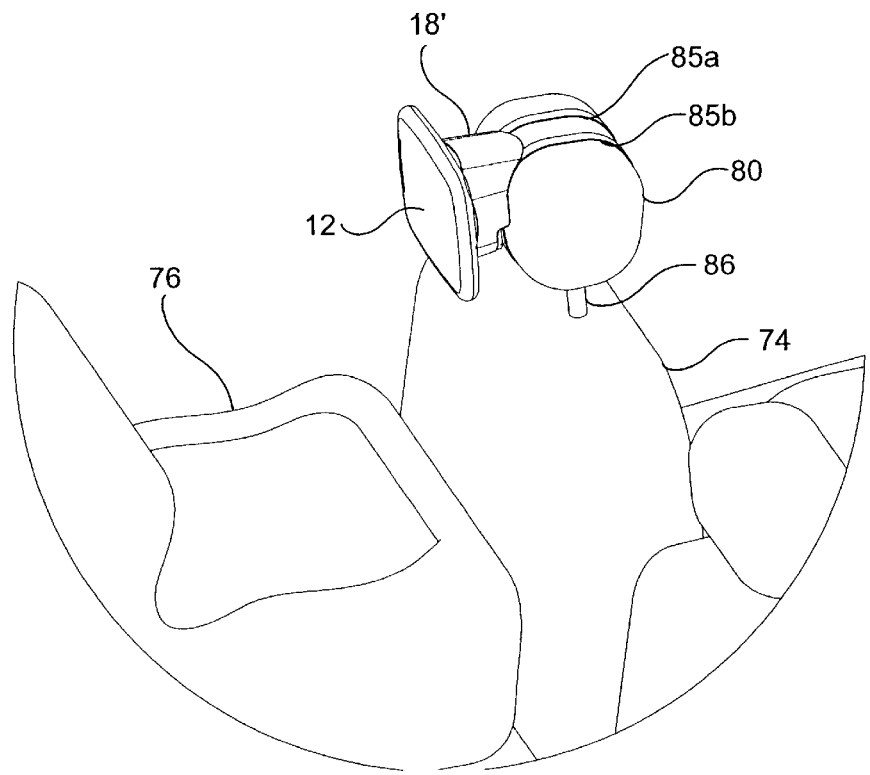
FIG. 7B is an isometric view illustrating an alternative approach for attaching the mirror to a vehicle seat headrest with straps.

FIG. 7A illustrates one preferred approach for attaching mirror 10 to a vehicle seat. One end of a nylon strap 84 is attached to mounting clip 19b of base 18. Nylon strap 84 is horizontally wrapped around headrest 80, and an opposite end of nylon strap 84 is attached to mounting clip 19*a* (not shown in this Figure). FIG. 7B illustrates another preferred technique for attaching mirror 10 to a vehicle seat. Two nylon straps 85*a* and 85*b* are vertically wrapped around headrest 80 of rear seat 74. Each nylon strap is routed through one or more brackets (not shown) on the back of a base 18', cinched tight, and secured around headrest 80 with conventional strap clips (not shown). Base 18' is optionally shaped to match the front surface contour of headrest 80.

Figure 8:
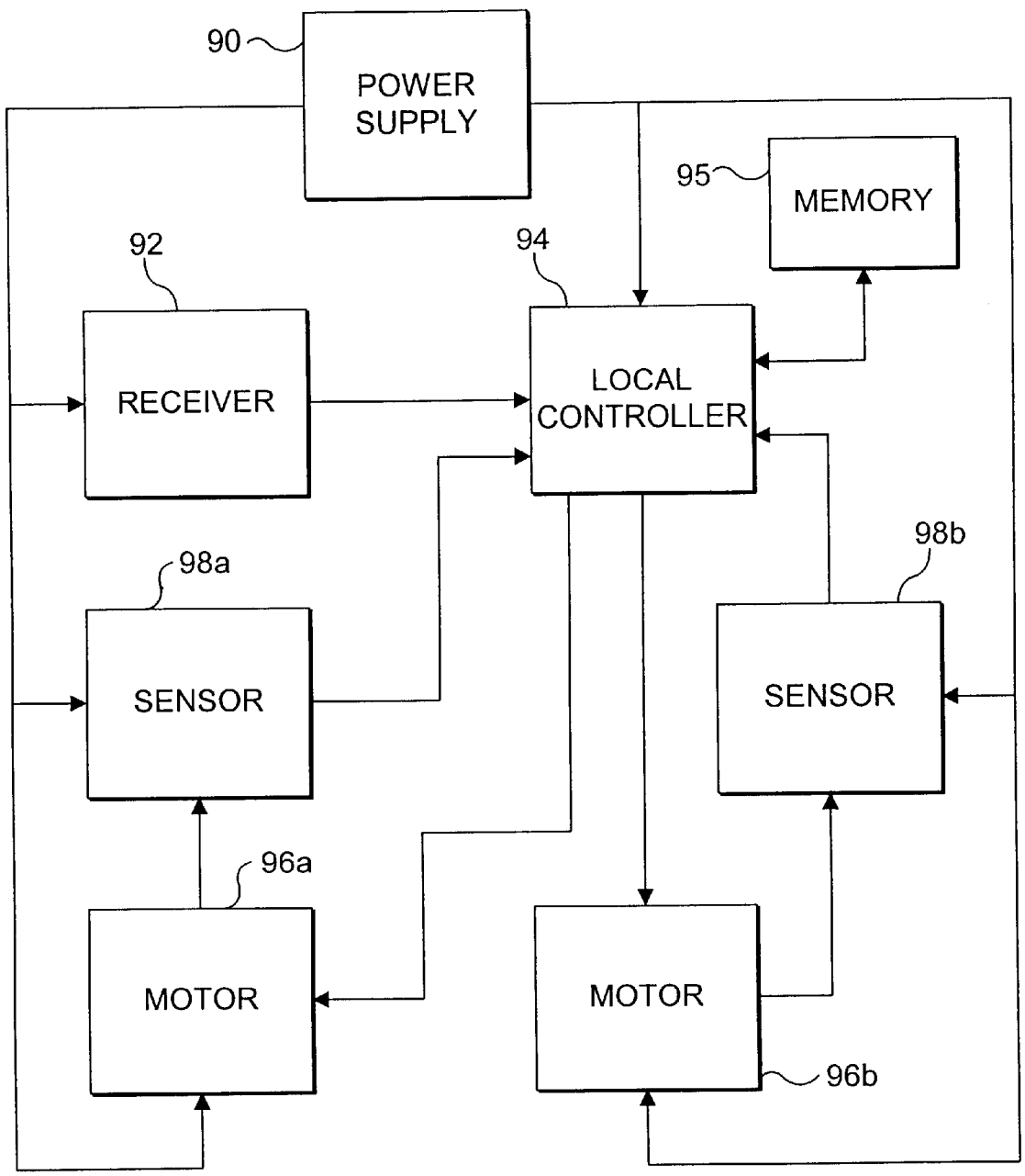
FIG. 8 is a functional block diagram of the wireless remote controlled mirror.

FIG. 8 is a block diagram of a preferred embodiment of an electrical circuit for mirror 10. A power supply 90 provides electrical power to all electrical components in the circuit that require power. Preferably, power supply 90 employs storage or rechargeable batteries; but optionally, it is also contemplated that power supply 90 can be energized with power drawn from the electrical system of a vehicle. For example, the mirror might be coupled to a cigarette lighter receptacle, to draw 12 volt direct current power from the vehicle battery/alternator (not shown). A receiver 92 receives a signal that was transmitted from a wireless remote controller (discussed below). Preferably, the signal is an RF signal, and receiver 92 is an RF receiver. However, those skilled in the art will recognize that an infrared receiver, microwave receiver, optical receiver, or other wireless signal receiver may by employed. Receiver 92 relays the signal to a local controller 94, which determines the type of command conveyed by the signal that was received. For example, the signal may convey a command that indicates a direction in which the reflective lens in mirror 10 is to move, or a defined position previously stored in memory to which reflective lens 12 is to be reoriented. Another command that can be indicated by the signal is a programming command that causes a current position of the reflective lens to be stored in memory. Optionally, memory 95 maybe used to store a plurality of previously set positions, in addition to storing machine instructions used for controlling local controller 94, and for storing other data. The commands can be pulse code modulated, or frequency shift keying, or may use other well known techniques for distinguishing between a limited set of commands conveyed by an RF signal or other type of signal.

Once local controller 94 determines the specific wireless command that was received, local controller 94 issues an appropriate drive signal to energize the prime mover, such as an electric motor 96*a*, which must cause the required movement to reorient the reflective lens. As described above, the motor causes its threaded shaft to rotate, which drives threads on the lens housing, thereby causing the lens housing to pivot. Preferably, electric motor 96*a* provides a driving force to move the motor housing in a selected direction about an axis that is orthogonal to the axis about which the driving force provided by electric motor 96*b* pivots the reflective lens. When electric motor 96*a* is energized, an optional sensor 98*a* detects motion of the lens housing. Sensor 98*a* may be any one of a number of conventional motion sensors, such as a potentiometer that detects rotation of the threaded shaft, an optical or magnetic sensor that detects pivoting of the lens housing, a timer that detects duration of motion, or a simple logic gate that only detects that motor 96*a* is energized. In turn, sensor 98*a* may optionally transmit a motion signal back to local controller 94 to provide a closed loop control; however, the user can monitor the orientation of the reflection in the reflective lens to provide the necessary closed loop control of the reflective lens orientation. Once receiver 92 no longer receives the transmitted wireless command from the wireless remote controller 100 or has achieved a position previously stored in memory, in accord with the command that was last transmitted, local controller 94 de-energizes the motor and motion of housing 14 and reflective lens 12 stops.

Figure 9:
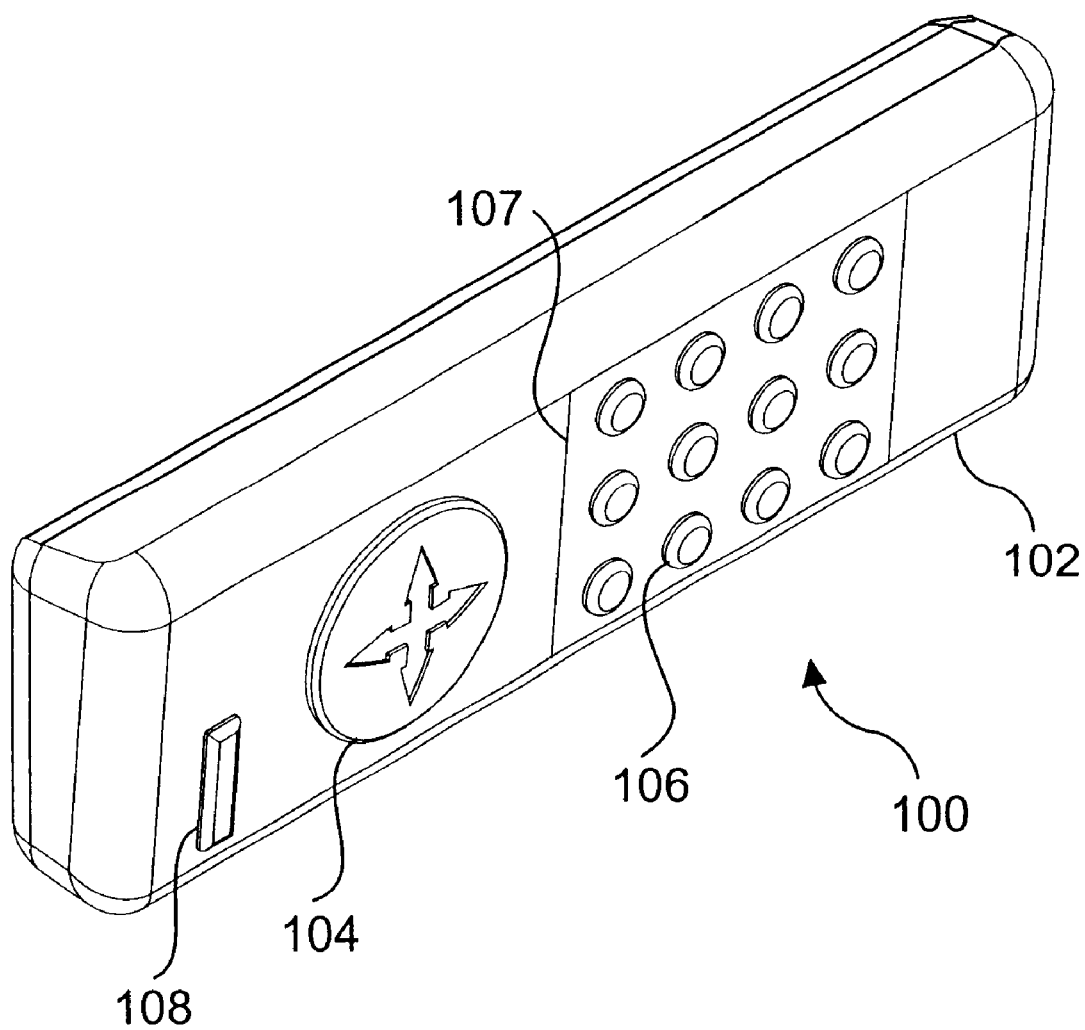
FIG. 9 is an isometric view of a wireless remote controller for use in controlling the orientation of the mirror.

A wireless remote controller 100 shown in FIG. 9 is preferably similar in shape and size to a key fob, such as those used to wirelessly, remotely lock and unlock a vehicle. Also, wireless remote controller 100 is preferably sized and shaped to be stored in channel 20 (shown in FIG. 2) when the mirror and remote controller are removed from the vehicle. A housing 102 of the remote controller is preferably made of a plastic material with a volume sufficient to contain a battery used for a power supply (not shown), a small circuit board (discussed below), and a four-position rocker switch 104. Preferably, wireless remote controller 100 transmits an RF signal that conveys different commands to the mirror. However, those skilled in the art will recognize that an infrared signal, a microwave signal, an optical signal, or other wireless signal may instead be employed.

Preferably, a four-position rocker switch 104 is used to control the desired directional orientation of reflective lens 12 in mirror 10. However, an additional keypad 107 can be provided to enable other types of commands or functions to be selected by a user. For example, pressing a keypad button 106 may cause wireless remote control 100 to transmit a signal, commanding an incremental position change of the mirror lens relative to one or both of the orthogonal axes of the mirror housing. Alternatively, specific keypad buttons on keypad 107 can be assigned to different previously set positions of the reflective lens that have been stored in the memory of mirror 10. For example, when one keypad button A is pressed, a signal is transmitted to the mirror commanding the reflective lens to move to a previously stored position assigned to keypad button A for use by a tall driver. Another position of the reflective lens might be stored in the memory for and assigned to a keypad button B for use by a short driver of the vehicle. In this manner, the setup time required to properly orient reflective lens 12 when either the short driver or the tall driver drives the vehicle after the other driver is substantially shortened. It would not be necessary to reorient the mirror incrementally each time that a different driver uses mirror 10 in the vehicle, following its use by another driver. This function is somewhat like that provide by a memory seat position in modern cars that enables a driver to select an assigned button that returns the seat and other driver specific setting to previously stored conditions. Another keypad button may enable a user to activate or deactivate an optional light (not shown) on the mirror.

In addition, remote controller 100 may include an optional indicator 108 that is a light emitting diode (LED) used to indicate that transmission of a wireless command signal is in progress. Alternatively, indicator 108 may be continuously lighted or blink in a specific pattern to indicate that power is available, or conversely, that battery power is low. Those skilled in the art will recognize that a variety of other buttons, keypad configurations, and/or other features may be included on the wireless remote controller 100. Such features may include operation as a universal remote control to control a door locking system, a panic button for sounding an alarm, a garage door opener, etc. It is also contemplated that dual mirrors 10 can be controlled with a single remote controller that is provided with a selector switch (not shown) to enable a user to select one of two different mirrors 10 that will be controlled with the signals transmitted from the remote controller.

Figure 10:
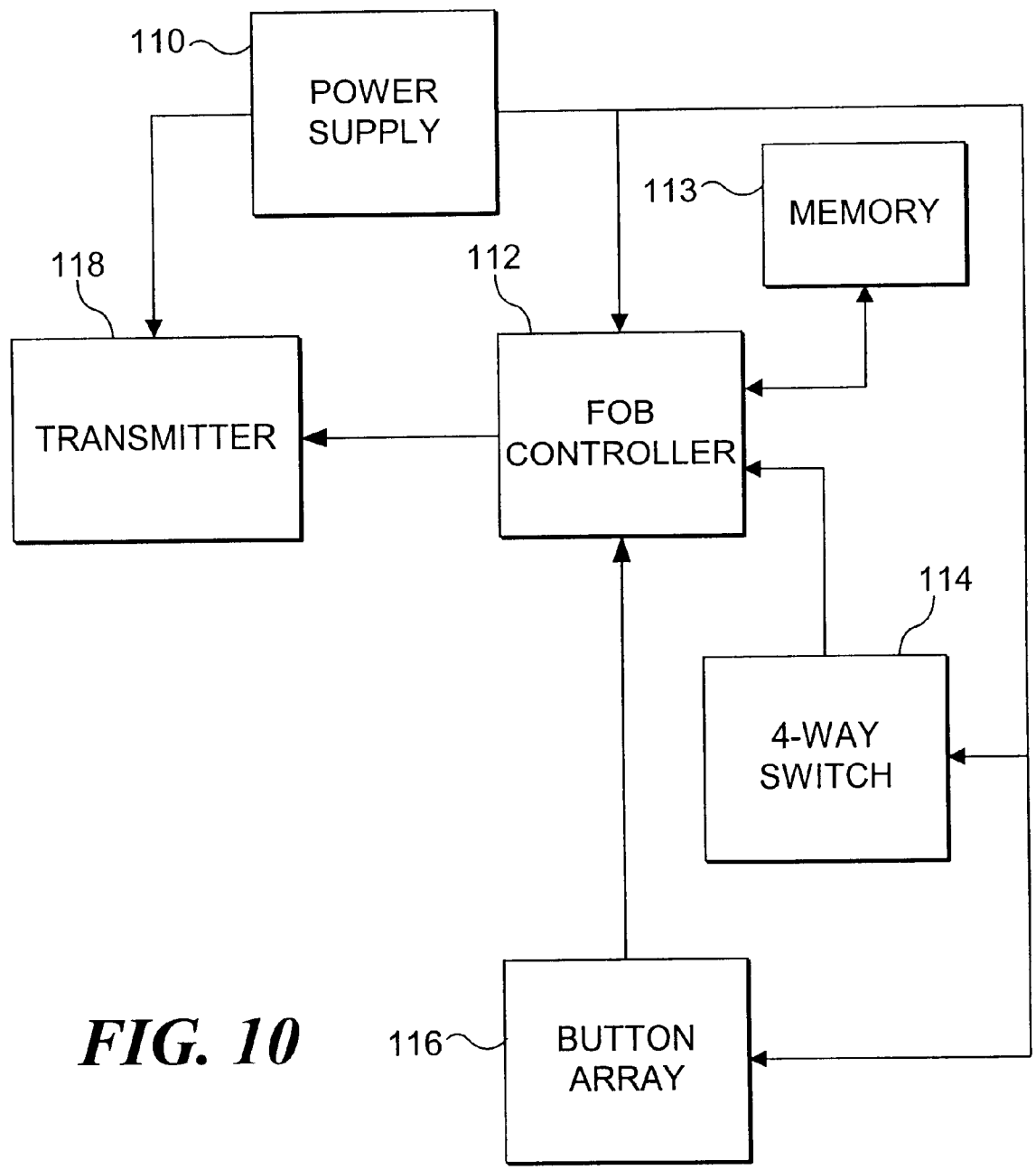
FIG. 10 is a block diagram of the wireless remote controller.

FIG. 10 is a block diagram of a preferred embodiment of an electrical circuit for wireless remote controller 100. A power supply 110 includes a storage or rechargeable battery that provides electrical power to all electrical components in the circuit that require such power. When a user indicates a desired direction by activating a four-way switch 114, the four-way switch selects the corresponding signal transmitted and a fob controller 112 provides the appropriately encoded signal to convey that command to a transmitter 118. Alternatively, one of the buttons on a button array 116 (corresponding to keypad 107) is activated by the user to indicate a command signal that fob controller 112 will cause transmitter 118 to transmit. Fob controller 112 determines the type of command that will be transmitted in response to the user action and controls transmitter 118, causing the transmitter to transmit that command. An optional memory 113 is used to store previously defined positions, options, machine instructions for fob controller 112, and other data.

FIGS. 11–18 illustrate other preferred embodiments for mounting the wireless remote controlled mirror to an object. FIG. 11 illustrates a clamp 120 that enables the mirror to be clamped to a child safety seat, or to a vehicle seat, or to some other object. It is contemplated that mirror 10 might be mounted to objects not used in a vehicle, such as to a shelf, a playpen, a swimming pool, a boat dock, or any other object suitable for supporting the mirror to view a desired location. Clamp 120 is preferably connected to base 18 by a semi-rigid, but flexible gooseneck 122. Gooseneck 122 enables coarse positioning of the mirror so that it is directed generally as desired, whereas the mirror provides fine positioning through its remote control functionality. Those skilled in the art will recognize that clamp 120 may be directly attached to base 18, or may be connected to base 18 in a variety of other ways.

FIG. 12 illustrates a suction cup 124 that enables the mirror to be mounted to a smooth surface 126. Suction cup 124 is preferably fabricated of an elastomeric material and is open on one side and shaped as a concave cup. Smooth surface 126 may include a window, a mirror, an appliance surface, a wall, or other surface sufficiently smooth to maintain a vacuum seal with suction cup 124. Suction cup 124 may optionally include a suction control/release 128 that enable a user to break the vacuum seal formed between suction cup 124 and smooth surface 126, so that the mirror can be released from the smooth surface. Also, suction cup 124 is preferably connected to base 18 with gooseneck 122 to facilitate coarse positioning of the mirror.

FIG. 13 illustrates an adhesive layer 130 that enables the mirror to be adhesively secured to an object or surface. Adhesive layer 130 comprises an appropriate adhesive material 132 applied to base 18. A permanent or reusable adhesive material 132 is employed that adheres to an object or surface, such as an exterior surface of a vehicle or a boat.

FIG. 14 illustrates a mounting plate 134 that enables the mirror to be more permanently mounted to an object or surface. Mounting plate 134 is preferably attached to an object or surface with one or more fasteners, such as threaded screws 136a and 136b. Mounting plate 134 is preferably connected to base 18 via a stem 140 and pivot joint 142. Stem 140 is preferably a hollow or solid rod. Joint 142 preferably enables mirror 10 to pivot in one or more degrees of freedom when sufficient force is applied (by hand), but to otherwise remain fixed in a coarse position selected by the user. For example, joint 142 may be a friction hinge, a ball joint, a "U" joint, or other mechanism that is adjustable, but will retain its position.

FIG. 15 illustrates a mounting stand 144 that enables the mirror to be placed on a table top, shelf, floor, or other horizontal surface. Mounting stand 144 is preferably attached to base 18 via one or more pivot hinges 146.

FIG. 16 illustrates a wireless remote controlled mirror 150 employed as a side rear-view mirror 150 mounted on the exterior of a vehicle 152. This embodiment can be used as a replacement for a manually adjusted side rear-view mirror or added to a vehicle originally purchased without a side rear-view mirror. This illustration is simply exemplary, since other techniques can be used to mount the side rear-view mirror to an external surface of a vehicle.

Figure 17:
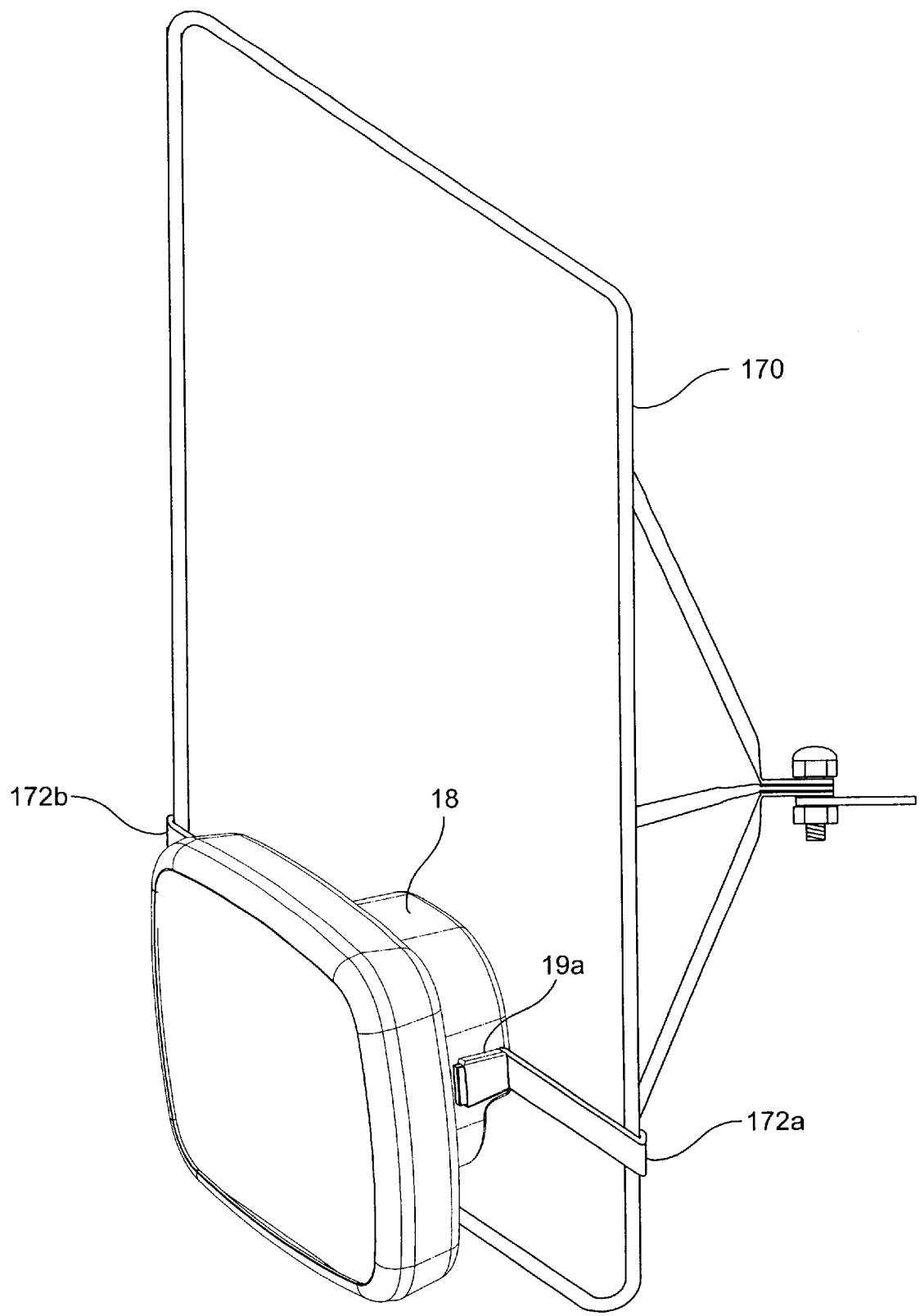
FIG. 17 is a side elevational view of the wireless remote controlled mirror mounted as an auxiliary mirror on a truck side rear-view mirror.

FIG. 17 illustrates the wireless remote controlled mirror mounted to a side rear-view truck mirror 170. Metal or plastic brackets 172a and 172b mount base 18 to the front lower portion of truck mirror 170. An end of bracket 172a is inserted into clip 19a of the wireless remote controlled mirror. Similarly, bracket 172b is attached to truck mirror 170 and inserted into clip 19b (not shown). Those skilled in the art will recognize that other mounting brackets may be employed to couple the wireless remote controlled mirror to truck mirror 170, or to replace truck mirror 170 using a suitable mounting frame.

Figure 18:
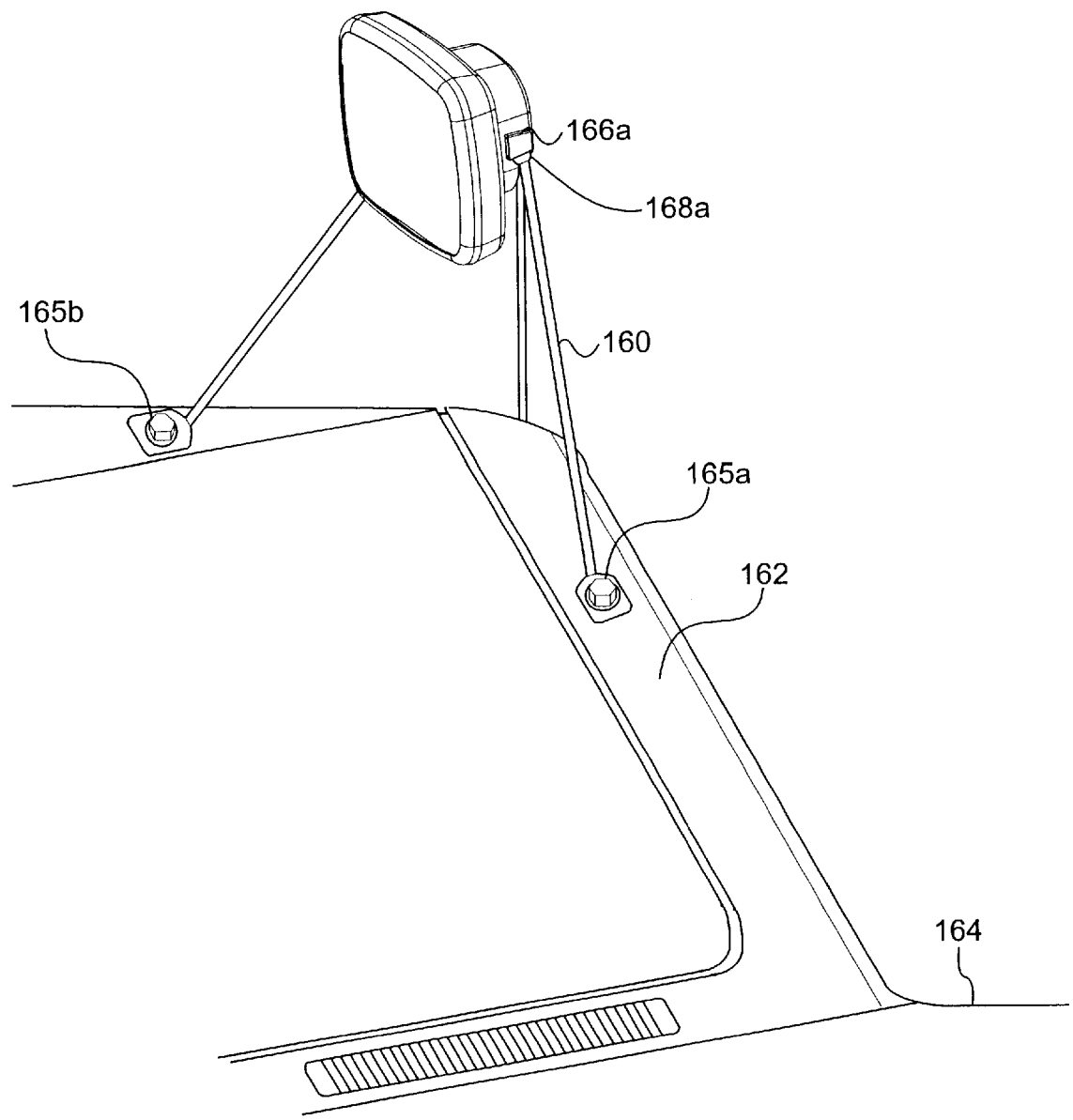
FIG. 18 is a side elevational view of the wireless remote controlled mirror mounted to the front of a vehicle using a mounting frame.

FIG. 18 illustrates a mounting frame 160 that enables the wireless remote controlled mirror to be attached to an object, such as a hood area 162 of a bus 164. Mounting frame 160 may be attached to bus 164, or other object, in any conventional manner, such as with bolts 165a, 165b and 165c (not shown). This embodiment can enable a user to wirelessly remotely control the view of persons passing in front of or behind a vehicle, or controllably view traffic around a corner.

Similarly, mounting frame 160 could be attached to a wall at an intersection of two hallways, or to a surface in a retail store overlooking a display of merchandise, enabling a user to wirelessly remotely control the view of persons or other moving objects around a corner to prevent collisions in the first instance, and to view anyone pocketing merchandise in the second instance. A mounting slot 166a that is attached to base 18 accepts a mounting flange 168a that is formed at an end of mounting frame 160. Other mounting slots and mounting flanges (not shown) are used to attach the wireless remote controlled mirror to mounting frame 160. Each mounting slot and flange may be further secured together with fasteners, adhesive, or other means. Those skilled in the art will also recognize that any of the above mounting means, or other suitable techniques may be used to mount the wireless remote controlled mirror to mounting frame 160. Also, the embodiments of FIGS. 16–18 may optionally be connected to a vehicle's electrical system with a single wire that extends from a suitable fuse connected to the +12 volt direct current supply of the vehicle, and to the power supply in the mirror. If the mirror mounts on the vehicle with a metal contact, such as a fastener into the sheet metal, a separate ground connection wire will not be required.

Although the present invention has been described in connection with the preferred form of practicing it and modifications thereto, those of ordinary skill in the art will understand that many other modifications can be made to the invention within the scope of the claims that follow. For example, any of the above mounting methods and components that enable coarse positioning of the mirror may be intermixed. Also, the wireless remote controller may be integrated into a vehicle, such as on a dashboard or door, eliminating the need for wiring to be routed to mirror 10, as would be the case for a conventional wired side rear-view mirror controller and its side rear-view mirror. Accordingly, it is not intended that the scope of the invention in any way be limited by the above description, but instead be determined entirely by reference to the claims that follow.

The invention in which an exclusive right is claimed is defined by the following:

1. A wireless remote controlled mirror, comprising:
   (a) a base, said base including means for supporting the base with a portion of a vehicle so as to enable a person seated in the vehicle to view the wireless controlled mirror;
   (b) a prime mover mounted on the base;
   (c) a reflective lens drivingly coupled to the prime mover and pivotally coupled to the base by a pivot joint to enable the reflective lens to move relative to the base in two substantially orthogonal directions; and
   (d) a receiver in electrical communication with the prime mover, said receiver including means to detect a wireless command signal from a remote controller that is activated by a user, for controlling the prime mover in response to the wireless command signal, to cause the prime mover to drive the reflective lens to a desired orientation to enable the person seated in the vehicle to view a reflection in the reflective lens from a desired direction.

2. The wireless remote controlled mirror of claim 1 wherein the means for supporting the base attaches the base to one of a fixed and a removable component used with a vehicle, enabling a front-facing driver of the vehicle to remotely control the reflective lens to view a rear-facing passenger disposed behind a front seat of the vehicle, when the reflective lens is remotely controlled to achieve the desired orientation.

3. The wireless remote controlled mirror of claim 1 wherein the means for supporting the base attaches the base to one of a side portion, a front portion, and a back portion of a vehicle, to enable a driver of the vehicle to achieve the desired orientation in order to view an area external to the vehicle.

4. The wireless remote controlled mirror of claim 1, wherein the means for supporting the base comprises at least one of a strap, a clamp, a suction cup, an adhesive layer, a fastener plate, a stand that supports the wireless remote controlled mirror on a surface, and a wireless remote controlled mirror to an object.

5. The wireless remote controlled mirror of claim 1, further comprising a lens housing in which the reflective lens is mounted, the lens housing including an opening through which a reflection in the reflective lens is viewed, and a back disposed opposite the opening, said back comprising a positioning surface that is coupled to the prime mover and is pivotally mounted to the base.

6. The wireless remote controlled mirror of claim 5, further comprising:
   (a) a threaded shaft rotatably connected to the prime mover and having driving threads along a substantial length of the threaded shaft; and
   (b) driven threads disposed on the positioning surface that engage the driving threads of the threaded shaft, rotation of the threaded shaft causing the lens housing and reflective lens to pivot.

7. The wireless remote controlled mirror of claim 5, further comprising an additional prime mover that is mounted to the base and is in electrical communication with the receiver, said prime mover pivoting the reflective lens about a first axis and said additional prime mover pivoting the reflective lens about a second axis that is generally orthogonal to the first axis, in response to the wireless command signal.

8. The wireless remote controlled mirror of claim 7, further comprising:
   (a) an additional threaded shaft rotatably connected to the additional prime mover and having driving threads along a substantial length of the additional threaded shaft; and
   (b) additional driven threads disposed on the positioning surface that engage the driving threads of the additional threaded shaft, rotation of the additional threaded shaft causing the lens housing and reflective lens to pivot about the second axis.

9. The wireless remote controlled mirror of claim 1, further comprising a battery power supply that provides electrical power to energize the receiver and to selectively energize the prime mover in response to the wireless command signal.

10. The wireless remote controlled mirror of claim 1, wherein the prime mover comprises an electric motor with a drive shaft that is rotatably coupled to the reflective lens.

11. The wireless remote controlled mirror of claim 1, wherein the receiver comprises one of a radio frequency receiver, an infrared receiver, a microwave receiver, and an optical receiver.

12. The wireless remote controlled mirror of claim 1, further comprising a local controller electrically connected between the receiver and the prime mover, and providing a drive signal to the prime mover in response to the wireless command signal.

13. The wireless remote controlled mirror of claim 12, further comprising a sensor in communication with the local controller and capable of detecting motion of the reflective lens.

14. The wireless remote controlled mirror of claim 1, wherein the remote controller comprises:
   (a) a power supply;
   (b) a wireless transmitter connected to the power supply; and
   (c) a position switch connected between the power supply and the wireless transmitter, such that when the position switch is activated, the wireless transmitter transmits the wireless command signal to the receiver indicating a direction in which the reflective lens is to be moved.

15. The wireless remote controlled mirror of claim 14, wherein the position switch selectively enables a user to control movement of the reflective lens in a selected one of a plurality of directions.

16. The wireless remote controlled mirror of claim 14, wherein the wireless transmitter produces one of a radio frequency signal, an infrared signal, a microwave signal, and an optical signal detectable by the receiver.

17. A method for controllably positioning a mirror relative to a base, comprising the steps of:
   (a) enabling a user to mount the mirror so as to view a passenger disposed behind a front seat in a vehicle;
   (b) enabling the user to select a direction in which the mirror is to be reoriented;
   (c) in response to the direction selected by the user, transmitting a wireless command signal indicative of the direction selected; and
   (d) in response to receiving the wireless command signal at the mirror, reorienting the mirror relative to the base in the direction selected by the user.

18. The method of claim 17, wherein the step of enabling the user to select the direction comprises the step of enabling the user to select one of four orthogonal directions in which the mirror is to be reoriented relative to the base.

19. The method of claim 11, further comprising the step of providing the user with a portable transmitter and switch for transmitting the wireless command signal.

20. The method of claim 19, further comprising the step of enabling the user to removably attach the portable transmitter to a surface within a vehicle.

21. A system for providing a view of a rear-facing person that is visible to a front-facing person within a vehicle, comprising:
  (a) a transmitter including means to be controlled by a front-facing person, to transmit a wireless signal indicating a desired adjustment to a reflected view of a rear-facing passenger;
  (b) a receiver disposed within a base that is spatially separate from the transmitter, said base including means for supporting the base with a portion of a vehicle so as to enable a person seated in the vehicle to view the wireless controlled mirror, said receiver including control means to receive the wireless signal transmitted from the transmitter, and for producing a control signal that enables the person seated in the vehicle to selectively adjust the view of the rear-facing person;
  (c) a reflective lens pivotally coupled to the base so as to move about two orthogonal axes relative to the base, for use in providing a reflected view of a rear-facing person; and
  (d) a first prime mover that is responsive to the control signal produced by the receiver, said first prime mover being drivingly coupled to the reflective lens and adapted to move the reflective lens about a first axis relative to the base, in response to the wireless signal, to an orientation controlled by a user with the transmitter, said control means varying the control signal in response to the wireless signal as to enable the person seated in the vehicle to remotely adjust the reflected view provided by the reflective lens so that the rear-facing person is visible to the person seated in vehicle.

22. The system of claim 21, further comprising a second prime mover that is responsive to the control signal produced by the receiver, said second prime mover being drivingly coupled to the reflective lens and adapted to move the reflective lens about a second axis relative to the base, in response to the wireless signal, to an orientation controlled by a user with the transmitter.

23. The system of claim 22, wherein the transmitter includes a multi-position switch that controls the wireless signal, said wireless signal being indicative of a selected position in which the switch is activated by a user, to control an orientation of the reflective lens about one of the first and the second axes.

24. The system of claim 22, wherein the reflective lens is mounted within a bezel housing that is pivotably attached to the base.

25. The system of claim 24, wherein a rear surface of the bezel housing includes a plurality of tracks, each of which include gear teeth, and wherein the first prime mover and the second prime mover each include drive shafts with gears that engage the gear teeth on a different one of the plurality of tracks, rotation of the drive shaft thereby causing the bezel housing to pivot relative to the base.

26. The system of claim 21, wherein the means for supporting the base comprises at least one of a strap, a clamp, an adhesive lager, a stand, a mounting frame, and a fastener.

27. The system of claim 21, wherein the transmitter includes a switch that is selectively controlled by a user to cause the transmitter to transmit the wireless signal used to modify the orientation of the reflective lens.

28. A method for controllably positioning a mirror relative to a base, comprising the steps of:
  (a) enabling a user to mount the mirror on an exterior of a vehicle to view an environment proximate to the vehicle;
  (b) enabling the user to select a direction in which the mirror is to be reoriented;
  (c) in response to the direction selected by the user, transmitting a wireless command signal indicative of the direction selected; and
  (d) in response to receiving the wireless command signal at the mirror, reorienting the mirror relative to the base in the direction selected by the user.

* * * * *

UNITED STATES PATENT AND TRADEMARK OFFICE
CERTIFICATE OF CORRECTION

PATENT NO. : 6,585,384 B2
DATED : July 1, 2003
INVENTOR(S) : Erik R. Nielsen et al.

It is certified that error appears in the above-identified patent and that said Letters Patent is hereby corrected as shown below:

Column 11,
Line 38, after "and a" insert -- mounting frame that attaches the --

Column 12,
Line 62, "claim 11" should read -- claim 17 --

Column 13,
Line 29, after "signal" (second occurrence) insert -- so --

Signed and Sealed this

Twenty-first Day of September, 2004

JON W. DUDAS
*Director of the United States Patent and Trademark Office*